United States Patent
Park

[19]

[11] Patent Number: 6,055,770
[45] Date of Patent: *May 2, 2000

[54] MOISTURE FEEDING APPARATUS FOR PLANTS

[76] Inventor: Hong Ku Park, 203 Southcrest Dr., Huntsville, Ala. 35802

[*] Notice: This patent is subject to a terminal disclaimer.

[21] Appl. No.: 09/071,725

[22] Filed: May 1, 1998

[51] Int. Cl.$^7$ .......................... A01G 29/00; A01G 27/04
[52] U.S. Cl. .......................... 47/48.5; 239/302; 239/379; 239/536
[58] Field of Search .................. 47/79, 48.5; 239/379, 239/145, 43, 44, 49, 50, 45, 46; 43/1; 222/187

[56] References Cited

U.S. PATENT DOCUMENTS

| | | | |
|---|---|---|---|
| 1,368,123 | 2/1921 | Donaldson | 239/145 |
| 1,621,420 | 3/1927 | Kruse | 118/267 |
| 2,406,746 | 9/1946 | Davis | 184/84 |
| 3,724,756 | 4/1973 | Maltenfort | 239/47 |
| 3,941,283 | 3/1976 | Garbe | 222/187 |
| 4,071,216 | 1/1978 | Einhorn | 248/290 |
| 5,238,187 | 8/1993 | Zlotnick et al. | 239/6 |
| 5,725,156 | 3/1998 | Park | 239/379 |
| 5,755,381 | 5/1998 | Yazaki | 239/43 |
| 5,806,240 | 9/1998 | Racine | 47/79 |

*Primary Examiner*—Michael J. Carone
*Assistant Examiner*—Son T. Nguyen
*Attorney, Agent, or Firm*—Waddey & Patterson, P.C.; John C. Garvin, Jr.

[57] ABSTRACT

An apparatus for dispensing moisture to one or more plants on a continuing and consistent basis. The moisture dispensing apparatus comprises a reservoir or container, a filament for suspending the reservoir or container from a suspension device, one or more hollow funnels, a wall mount for holding one or more containers having plants therein, and a member for controlling the flow of moisture to the one or more plants.

18 Claims, 2 Drawing Sheets

MOISTURE FEEDING APPARATUS FOR PLANTS

FIELD OF THE INVENTION

The invention disclosed herein relates to plant watering apparatuses and more particularly to apparatuses for supplying water or other liquids to plants on a continuous and consistent basis.

BACKGROUND OF THE INVENTION

The prior art abounds with apparatuses for supplying water or other liquids to plants but they have generally suffered from several deficiencies and disadvantages. The following U.S. patents are exemplary of such prior art apparatuses: U.S. Pat. Nos. 3,125,255; 3,168,224; 3,357,129; 4,060,934; 4,578,897; 4,829,708; 4,848,029; 4,942,692. Several of these prior art apparatuses utilize a system which is activated in response to water loss by the plants and require complex mechanisms to operate them. Many of the prior art apparatuses include spring loaded valves which are affected by changes in temperatures which often result in the plants being overwatered on very hot days. Still other of the prior art apparatuses require that the plants to be watered must be placed upon the apparatuses themselves. Many other of the prior art apparatuses cannot be utilized with plants positioned in pots or containers which are hung from a ceiling, wall or the like, but can be used solely to water plants positioned in pots or containers located on the floor or ground. Furthermore, many of the prior art apparatuses must be assembled from new parts and cannot be made from bottles or the like which would otherwise take up space in solid waste facilities.

U.S. Pat. No. 5,725,156 entitled "Moisture Feeding Apparatus For Plants" issued on Mar. 10, 1998 to applicant discloses and claims an apparatus for dispensing moisture to one or more plants on a continuing and consistent basis. However, it has been found since the issuance of U.S. Pat. No. 5,725,156, that while the apparatus of said patent is well suited for purposes described therein, the apparatus is not suited for providing moisture for several plants located in a vertical column. Accordingly, the present invention is an improvement over U.S. Pat. No. 5,725,156. U.S. Pat. No. 5,725,156 is incorporated herein by reference.

The instant invention relates to an apparatus for supplying moisture to plants located in a vertical column on a continuous and consistent basis and which can be made from disposable plastic containers, which overcomes the deficiencies and disadvantages of the prior art apparatus. Of course, the apparatus of the present invention could be made from all new components.

SUMMARY OF THE INVENTION

The present invention relates to a moisture dispensing apparatus for use with plants which can be made in large part from used containers that would otherwise be buried in landfills or treated in a solid waste facility. The moisture dispensing apparatus of the instant invention comprises a reservoir or container, a filament for suspending the reservoir or container from a suspension device, one or more hollow funnels, a wall mount for holding one or more containers with plants therein, and means for controlling the flow of moisture from the container or reservoir through the one or more hollow funnels to the plant(s).

It is therefore an object of the present invention to provide an improved moisture feeding apparatus for plants.

It is another object of the invention to provide an improved apparatus that feeds moisture on a continuing and consistent basis to plants located in a vertical column.

It is yet another object of the invention to provide an improved apparatus which is simple and inexpensive in construction for feeding moisture on a continuing and consistent basis to a single plant or a plurality of plants.

These objects as well as other objects of the present invention will become more readily apparent after reading the following description in conjunction with the accompanying drawings.

DETAILED DESCRIPTION OF THE PREFERRED EMBODIMENT

Figure 1:
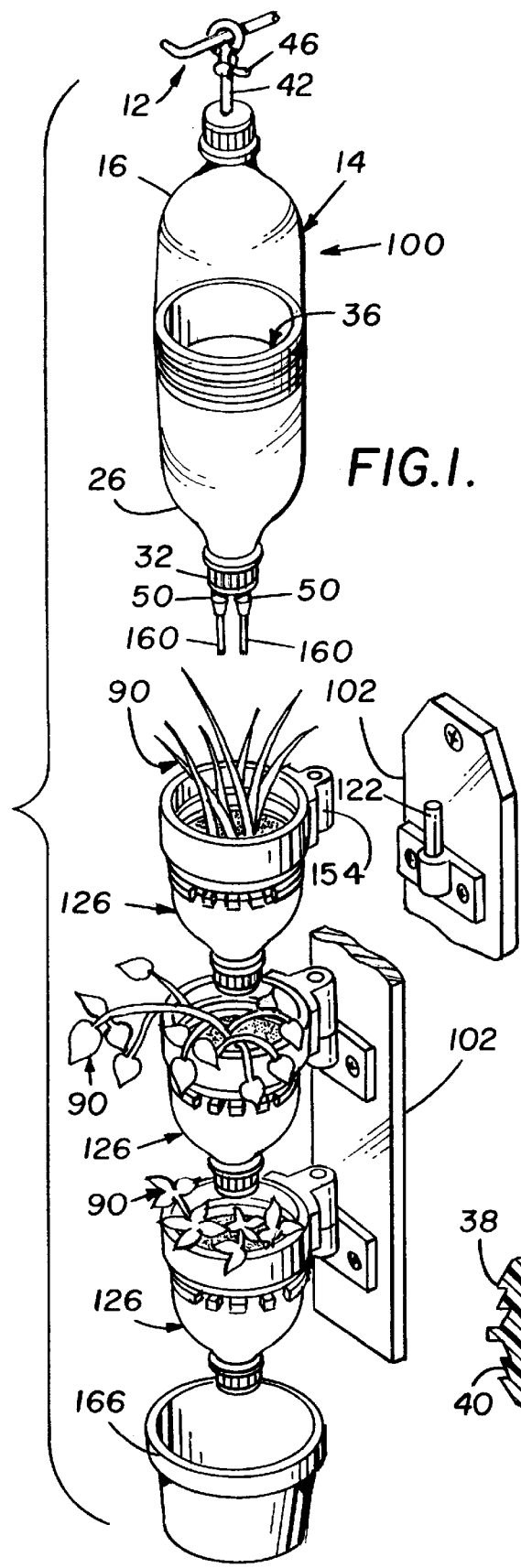
FIG. 1 is an exploded, front, elevational, partially broken away, view of the moisture feeding apparatus for plants of the present invention.
Figure 5:
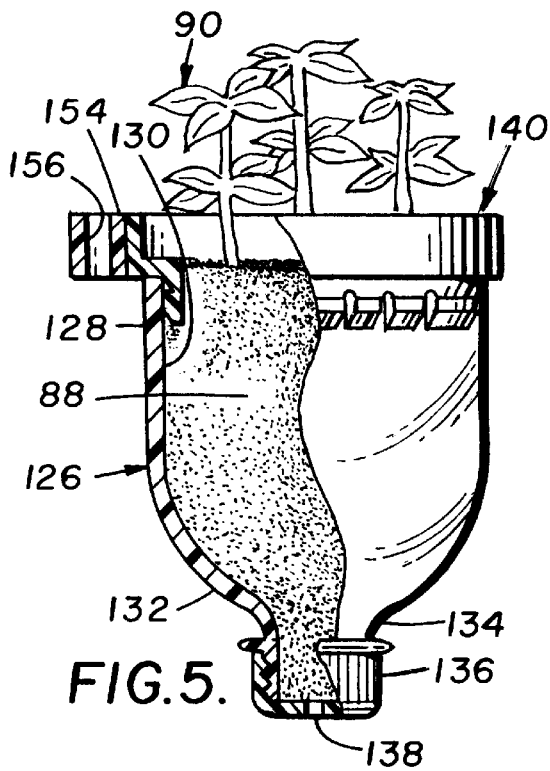
FIG. 5 is a front elevational, partially broken away and in section, view of one plant container, insert ring and bracket incorporated in the moisture feeding apparatus of the present invention.

Referring now to the drawings, and particularly to FIGS. 1 and 5 thereof, the numeral 100 designates generally the moisture feeding apparatus of the present invention for mounting on a suspension device 12 and for feeding moisture such as water on a continuous and consistent basis to plants 90 in plant holding containers 126 mounted in a vertical column on wall mount 102. Moisture feeding apparatus 100 generally comprises a container or reservoir 14 formed by a pair of separable chambers 16 and 26 which are joined by a cylindrical ring 36 (FIG. 3) having an annular central rib (unnumbered), and a plurality of ribs 38 and valleys 40 for telescoping within an enlarged lower end portion 24 (FIG. 2) of upper chamber 16 and an enlarged upper end portion 34 (FIG. 2) of lower chamber 26.

Figure 2:
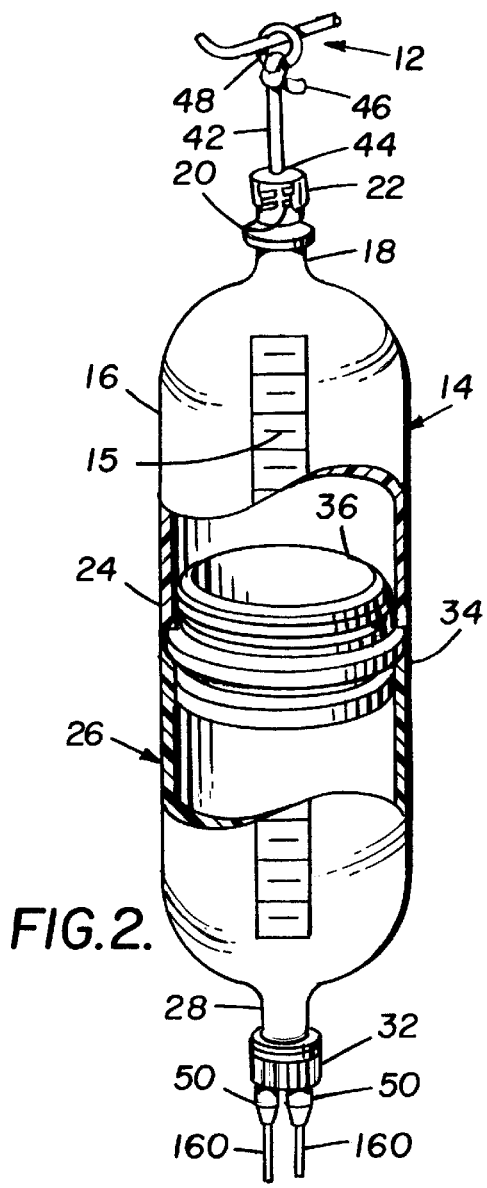
FIG. 2 is a front, elevational, partially broken way and in section, view of the container or reservoir and some associated components of the moisture feeding apparatus of the present invention.
Figure 3:
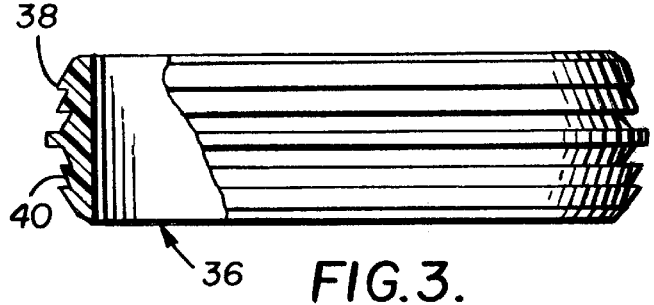
FIG. 3 is a front elevational, partially broken away and in section, view of the connecting ring of the moisture feeding apparatus for plants of the present invention.

As best seen in FIG. 2, upper chamber 16 is provided with a reduced neck portion 18 having external threads 20, an internally threaded cap 22 and an enlarged lower portion 24. Lower chamber 26 is provided with a reduced neck portion 28 with external threads (not shown but similar to threads 20), a cap 32 having internal threads (not shown) and an enlarged upper portion 34.

As seen in FIGS. 1 and 2, suspension filament 42 is provided and includes a first end 44 which is secured to cap 22 by any suitable means such as an adhesive and a second end 46 which is secured to a fastener or ring 48 by any suitable means such as a knot in second end 46 with the ring or fastener 48 being adapted for connection to suspension device 12. The container or reservoir 14 is preferably transparent so that it can be readily observed to indicate how much water or other liquid is contained therein and has an indicia strip 15 mounted in or outside the container or reservoir 14 for quantifying the volume of liquid within container or reservoir 14.

Figure 4:
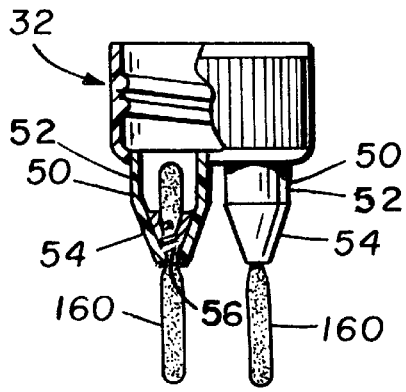
FIG. 4 is a front elevational, partially broken away and in section, view showing the details of the lower cap, the dual funnels, wicks, wick supports and fluid restriction means of the moisture feeding apparatus for plants of the present invention.

As best seen in FIGS. 1, 2 and 4, a pair of hollow funnels 50, each having an enlarged upper portion 52 is secured to cap 32 by any suitable means such as an adhesive, or funnels 50 may be made integral with cap 32, and a tapered lower portion 54 with a small opening 56.

Referring now to FIG. 1 of the drawings, the moisture feeding apparatus 100 of the present invention is partially mounted on a suspension device 12 and partially mounted on a wall mount 102. Moisture feeding apparatus 100 further includes a plurality of plant holding containers 126 arranged in a vertical column on wall mount 102 and having soil 88 therein; a plurality of insert rings 140 (FIGS. 5 and 7) for attachment to respective plant holding containers 126; a plurality of first brackets 154 attached to respective insert rings 140; and a plurality of second brackets 112 attached to wall mount 102.

Figure 6:
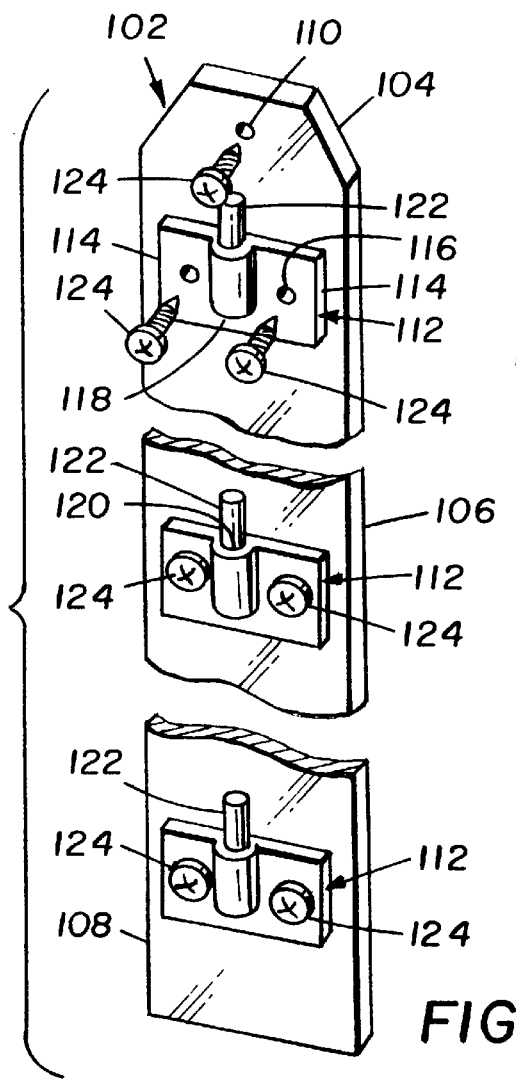
FIG. 6 is an exploded and partially broken away view of the wall mount and its associated components incorporated in the moisture feeding apparatus of the present invention.
Figure 8:
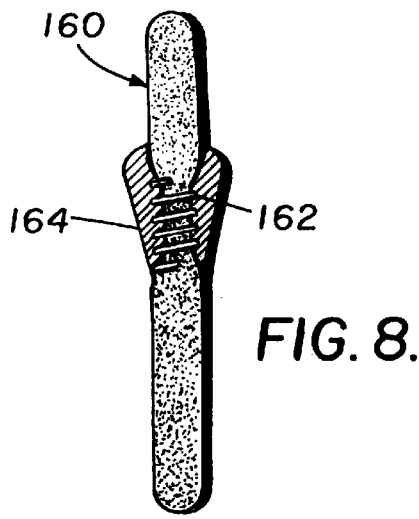
FIG. 8 is a front elevational, partially broken away and in section, view of a wick, tapered wick support and fluid restriction means as incorporated in the moisture feeding apparatus of the present invention.

As best seen in FIGS. 1 and 6, wall mount 102 includes an upper section 104, an intermediate section 106, a lower section 108 and one or more openings 110 for receiving a screw 124 for fastening the wall mount 102 to a vertical wall (not shown). As best seen in FIG. 6, a plurality of first brackets 112 are provided, each bracket 112 including a pair of wings or extensions 114 with openings 116 therein, and an enlarged central portion 118 with an opening 120 therein whose walls are perpendicular to the walls of openings 116. Each first bracket 112 is secured to wall mount 102 in spaced relationship by screws 124 which pass through a respective opening 116 in wings or extensions 114. A dowel pin or peg 122 is mounted within each opening 120 in enlarged central portion 118 of each first bracket 112 for purposes which will be later explained.

Figure 7:
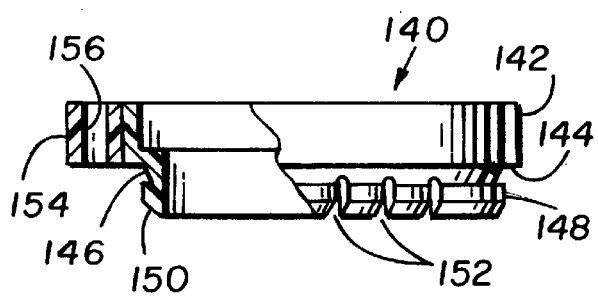
FIG. 7 is a front elevational, partially broken away and in section, view of one insert ring and one bracket as incorporated in the moisture feed apparatus of the present invention.

As best seen in FIG. 5, each hollow plant holding container 126 includes an upper section 128 with a central opening 130, a lower section 132 with a reduced externally threaded neck portion 134, and an internally threaded cap 136 having a small opening 138 therein. As best seen in FIGS. 5 and 7, each insert ring 140 includes an annular upper section 142, a shoulder 144, an annular groove 146, an annular lower section 148 with a tapered portion 150, and a plurality of slits 152. The slits 152 provide resiliency to the annular lower section 148 to enable the insert rings 140 to fit within upper sections 128 of containers 126 of varying internal dimensions. As best seen in FIGS. 1, 5 and 7, second brackets 154 having openings 156 are secured to the annular upper section 142 of each insert ring 140 by any suitable means such as an adhesive or screws. The second brackets 154 might have wings or extensions similar to the wings or extensions 114 of the first brackets 112 for receiving screws 124 for securing a second bracket 154 to the annular upper section 142 of a respective insert ring 140.

As best seen in FIGS. 2 and 4, a pair of wicks 160 are mounted within funnels 50 for feeding moisture to the plants 90. A coil of wire 162 is wrapped around each wick 160 for controlling the flow of moisture from the container or reservoir 14. A metal wrapping, fishing line, or something similar could be used instead of the coil of wire 162 to restrict the flow of fluid through wicks 160. Each wick 160 and coil of wire 162 is mounted within a tapered wick support 164.

The containers or reservoirs 14 are preferably made of transparent plastic materials; however, they are susceptible of being made of any suitable material, whether transparent or not. As mentioned hereinabove the reservoir 14 can be made of used one, two, three liter or other size plastic bottles in which various colas are packaged when purchased. The use of the empty cola bottles helps the environment in that such bottles will not have to be buried in landfills or treated in a solid waste facility.

The container or reservoir 14 of the moisture feeding apparatus 100 of the present invention is assembled by telescopically inserting a respective end of cylindrical ring 36 within the enlarged lower end portion 24 of upper chamber 16 and the enlarged upper end portion 34 of lower chamber 26 with the raised ribs 38 of cylindrical ring 36 tightly and frictionally engaging the inner walls of the enlarged lower end portion 24 and the enlarged upper end portion 34. If the frictional connection of upper chamber 16 and lower chamber 26 of reservoir 14 with cylindrical ring 36 is not adequate, a suitable adhesive might be used to bond or secure the cylindrical ring 36 to upper and lower chambers 16 and 26. After the reservoir or container 14 is assembled as explained hereinabove, the cap 22, with filament 42 secured thereto, is threadedly secured to the reduced neck portion 18 of upper chamber 16 and the cap 32, with the two funnels 50 secured thereto and with a wick 160, coiled wire 162, and wick support 162 within each funnel 150, is threadedly secured to the reduced neck portion 28 of lower chamber 26. The wall mount 102, brackets 112 and pins 122 are assembled by attaching the brackets 112 in spaced relationship (as best seen in FIGS. 1 and 6) to wall mount 102 by screws 124, and pins 122 are then placed within respective openings 120 of brackets 112. The wall mount 102 is then secured to a wall by one or more screws 124 at a location directly under the reservoir 14 such that the wicks 160 would be in alignment with the plant containers 126. Each plant container 126 and an insert rings 140 with brackets 154 secured thereto are assembled by placing the annular lower portion 148 of an insert ring 140 into the central opening 130 in upper section 128 of container 126. The soil 88 and plants 90 or seeds are then placed within each container 126. The containers 126 are then attached to the wall mount 102 by placing the opening 156 in bracket 154 around a respective pin 122 of bracket 112 which has been previously secured to wall mount 102.

In operation, the cap 22 is removed from the upper reduced neck portion 18 of container 14 and the container 14 is filled with a liquid such as water or a mixture with water therein, after which the cap 22 is replaced onto reduced neck portion 18. The container 14 is next suspended from an approximate suspension device 12 by engagement of fastener 48 with the suspension device 12 which is located such that the reservoir or container 14 with its wicks 160 will be located just above the plant containers 126 with its plants 90 being in a vertical column as generally shown in FIG. 1. In operation, a small amount of moisture from the reservoir 14 will be released by the wicks 160 to the uppermost plant container 126 where the moisture will slowly gravitate to its bottom and be released through the opening 138 in end cap 136 to the next lower plant container 126 where the moisture will slowly gravitate to the bottom of such container and be released through the opening 138 in its end cap 136, etc. A bucket 166 may be provided below the lowermost plant container 126. In the alternative, an end cap 136 without an opening 138 may be secured to the lowermost plant container 126.

While the above description constitutes the preferred embodiment of the present invention, it will be appreciated that the invention is susceptible to modification, variation and change without departing from the proper scope and fair meaning of the accompanying claims. For example, the plant containers 126 could be supported by a structure such as a table, stand or rack not secured to a vertical wall as is wall mount 102.

I claim:

1. The combination of at least one plant and an apparatus adapted for suspension over said at least one plant for dispensing moisture on a continuous and consistent basis to said at least one plant, said apparatus comprising:

a hollow container including an upper chamber having a reduced neck portion and an enlarged lower end portion, a lower chamber having a reduced neck portion and an enlarged upper end portion, and means for connecting said enlarged lower end portion of said upper chamber to said enlarged upper end portion of said lower chamber;

at least one hollow funnel in communication with said reduced neck portion of said lower chamber, said at least one funnel including an enlarged upper end portion and a tapered lower portion having an exit passage therein;

means for supporting said hollow container above said at least one plant;

means within said exit passage for controlling the amount of said liquid which flows through said exit passage; and means for supporting said at least one plant under said hollow container whereby said liquid is continuously and consistently fed to said at least one plant.

2. The combination of claim 1 wherein said means for controlling the amount of said liquid which flows through said exit passage includes at least one wick.

3. The combination of claim 2 wherein said means for controlling the amount of said liquid which flows through said exit passage includes a member encircling said at least one wick.

4. The combination of claim 3 wherein said member encircling said at least one wick includes a wire having at least one convolution wrapped around said at least one wick.

5. The combination of claim 4 wherein said means for controlling the amount of said liquid which flows through said exit passage further includes means for supporting said at least one wick and said wire within said exit passage.

6. The combination of claim 5 wherein said means for supporting said at least one plant includes a wall mount and at least one bracket.

7. The combination of claim 2 wherein said means for controlling the amount of liquid which flows through said exit passage further includes a coil of wire wrapped tightly around said at least wick, and means for supporting said coil of wire and said at least one wick within said exit passage.

8. The combination of claim 7 wherein said means for connecting said enlarged lower end portion of said upper chamber to said enlarged upper end portion of said lower chamber comprises a hollow, generally, cylindrical ring which connects said enlarged lower end portion of said upper chamber and said enlarged upper end portion of said lower chamber.

9. The combination of a plurality of plants and an apparatus adapted for suspension over said plurality of plants for dispensing moisture on a continuous and consistent basis to said plants, said apparatus comprising:

a hollow container including an upper chamber having a reduced neck portion and an enlarged lower end portion, a lower chamber having a reduced neck portion and an enlarged upper end portion, and means for connecting said enlarged lower end portion of said upper chamber to said enlarged upper end portion of said lower chamber;

a plurality of hollow funnels in communication with said reduced neck portion of said lower chamber, each of said funnels including an enlarged upper end portion and a tapered lower portion having an opening therein;

means for supporting said hollow container above said plurality of plants;

means within each said tapered lower portion of each said funnel for controlling the amount of moisture which flows through said opening in said tapered lower portion of each said funnel; and means for supporting each said plant aligned in a vertical column whereby said moisture is continuously and consistently fed to each said plant.

10. The combination of claim 9 wherein said means for controlling the amount of said liquid which flows through said opening in said tapered lower portion of each said funnel includes a wick.

11. The combination of claim 10 wherein said means for controlling the amount of said liquid which flows through said opening in said tapered lower portion of each said funnel further includes a member wrapped around and encircling said wick.

12. The combination of claim 11 wherein said member wrapped around and encircling said wick includes a wire having at least one convolution wrapped around said wick.

13. The combination of claim 12 wherein said means for controlling the amount of said liquid which flows through said opening in said tapered lower portion of each said funnel further includes means for supporting said wick and said wire within said tapered lower portion of each said funnel.

14. The combination of claim 13 wherein said means for supporting said at least one plant includes a wall mount and at least one bracket.

15. The combination of claim 9 wherein said means for controlling the amount of liquid which flows through said opening in said lower portion of each said funnel further includes a wick and a coil of wire wrapped tightly around said wick and means for supporting said coil of wire and said wick within said lower portion of each said funnel.

16. The combination of claim 15 wherein said means for connecting said enlarged lower end portion of said upper chamber to said enlarged upper end portion of said lower chamber comprises a hollow, generally, cylindrical ring which telescopes within said enlarged lower end portion of said upper chamber and said enlarged upper end portion of said lower chamber for connecting same.

17. In combination, at least one plant bed and an apparatus adapted for suspension over said at least one plant bed for dispensing a predetermined amount of liquid on a continuous and consistent basis to said at least one plant bed, said apparatus comprising:

fluid reservoir means including at least one exit passage having tapered walls for continuously passing said liquid therethrough, said fluid reservoir means comprising a container having an upper chamber, a lower chamber, and means for securing said lower chamber to said upper chamber;

means for supporting said fluid reservoir means above said at least one plant bed, said means includes a wall mount and at least one bracket for removably securing said at least one plant bed to said wall mount;

means within said exit passage for controlling the amount of said liquid which flows through said at least one exit passage, said means for controlling the amount of liquid which flows through said at least one exit passage further includes at least one wick, a coil of wire wrapped tightly around said at least one wick and means for supporting said coil of wire and said at least one wick within said at least one exit passage; and means for supporting said at least one plant bed under said fluid reservoir means whereby said liquid is continuously and consistently fed to said at least one plant bed.

18. The combination of claim 17 wherein said means for securing said lower chamber to said upper chamber comprises a hollow cylindrical ring which connects said lower chamber and said upper chamber, said cylindrical ring including an annular upper section, an annular lower section with a plurality of slits therein, and an annular groove separating said annular upper section and said annular lower section.

* * * * *